United States Patent Office 3,015,927
Patented Jan. 9, 1962

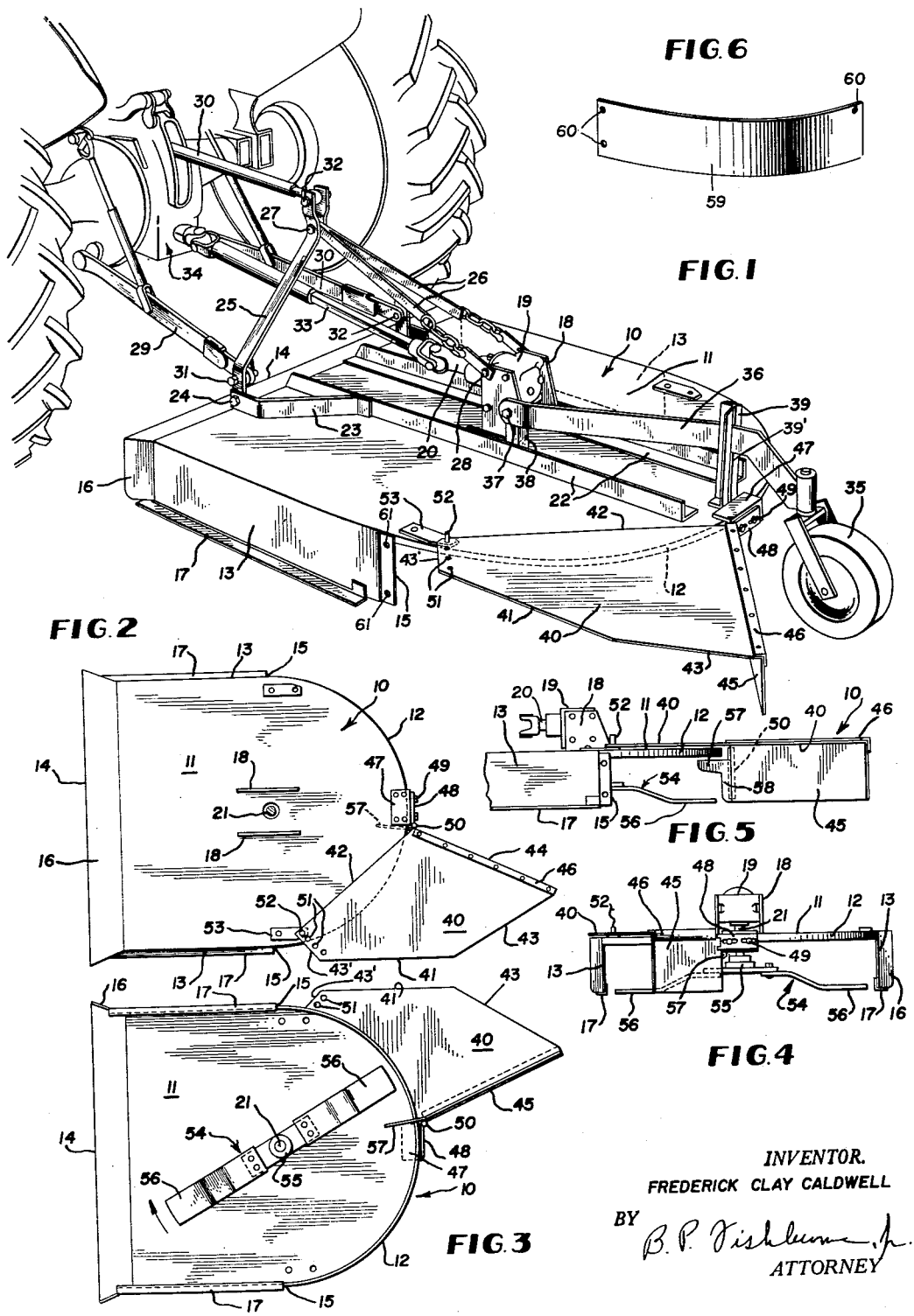

3,015,927
ROTARY MOWER WITH WINDROWING ATTACHMENT
Frederick Clay Caldwell, Corpus Christi, Tex., assignor to E. L. Caldwell & Sons, Inc., Corpus Christi, Tex., a corporation of Texas
Filed Dec. 23, 1959, Ser. No. 861,506
3 Claims. (Cl. 56—25.4)

This invention relates broadly to rotary mowers and more particularly to hay-making means for such mowers adapted to deposit the hay in a windrow as the mower advances.

An object of the invention is to provide a hay-making and windrowing attachment for a rotary mower, which is adjustable to regulate the width of the windrow being formed by the machine.

A further object is to provide a hay-making attachment for rotary mowers including an angularly adjustable stop or deflector to distribute the hay in a windrow and a cooperating finger element on said deflector adjacent to the rotary cutter blade to arrest the movement of the cut material so that it will be deposited on the ground in a proper position for engagement by said deflector.

A further object is to provide a hay-making machine of the above-mentioned character which bruises the stems of the cut material in such a manner that they tend to dry out faster, and can be baled sooner than hay made by conventional hay-making machines or attachments.

A further object is to provide means of the above-mentioned character which is highly simplified in construction, sturdy and durable, and economical to manufacture.

Other objects and advantages of the invention will be apparent during the course of the following description.

In the accompanying drawings forming a part of this application and in which like numerals are employed to designate like parts throughout the same:

FIGURE 1 is a perspective view of a mower having the hay producing attachment in accordance with the invention.

FIGURE 2 is a plan view, partly diagrammatic, of the mower housing and attachment, with parts omitted for the purpose of clarity.

FIGURE 3 is a bottom plan view of the same with parts omitted.

FIGURE 4 is a rear end elevation of the device as illustrated in FIGURE 2.

FIGURE 5 is a fragmentary side elevation of the mower housing and attachment.

FIGURE 6 is a perspective view of a detachable side wall portion of the housing employed when the hay making attachment is not used.

In the drawings, wherein for the purpose of illustration is shown a preferred embodiment of the invention, the numeral 10 designates generally a housing for the rotary mower including a top wall 11, circularly rounded at its rear end 12. The housing 10 further comprises depending parallel vertical side wall portions 13, which extend from the forward transverse end 14 of the housing top wall to points 15, adjacent the rear curved end 12, as shown. The housing 10 is entirely open at its bottom and forward end, and the mouth of the housing at its forward end is preferably flared as at 16. The rear end of the housing 10 defined by the curved end 12 is also fully open, and there is no marginal end wall for the housing below the end 12.

The lower edges of the longitudinal side wall portions 13 are preferably reinforced by bars or runners 17, welded or otherwise rigidly secured thereto.

A pair of spaced upstanding bracket plates 18 are rigidly secured to the housing top wall 11, centrally thereof, and rigidly secured between these bracket plates is a conventional right angle bevel gear drive 19, having a forwardly extending horizontal input shaft 20, and a depending vertical drive or output shaft 21 to operate the mower cutter blade to be described. The shaft 21 operates through a central opening in the housing top wall 11.

Reinforcing rails 22 are rigidly secured to the top of housing 10, as shown, and forward horizontal diverging bracket extensions 23 of the rails 22 are connected at 24 with a standard three point hitch yoke 25, vertically disposed adjacent the forward end of the housing 10, as shown. Lift links 26 interconnect the top of the yoke 25 with the brackets 18, as indicated at 27 and 28. The usual power-operated tractor lift arms 29 and 30 are connected at 31 and 32 with the upstanding yoke 25 as shown in FIGURE 1, and this construction is largely conventional and may be varied as found desirable.

The input shaft 20 of the right angle gear drive 19 receives power from the usual power take-off shaft 33 of the tractor 34.

By the above-described means, the mower housing 10 is bodily carried by the tractor 34 and adapted to be raised and lowered relative to the ground, as should be obvious.

A trailing wheel 35 for the mower may be provided, carried by a longitudinal arm 36, having its forward end pivoted at 37 to an upstanding post 38, rigidly mounted upon the housing top wall. The arm 36 operates through a vertical guide slot 39' in an upstanding post 39, likewise rigidly secured to the housing top wall adjacent its rear end 12.

The hay-making and windrowing attachment proper comprises a horizontal top plate 40, preferably of the marginal shape shown in the drawings and adapted to overlap the rear end portion of the housing top wall 11 adjacent one side of the curved end 12. The plate 40 lies close to the top wall 11 and projects somewhat laterally outwardly thereof and a substantial distance rearwardly thereof, as shown in the drawings. The plate 40 has a marginal edge 41 extending normally parallel to the adjacent side wall portion 13, somewhate outwardly thereof, and generally diagonal forward and rear edges 42 and 43 which are substantially parallel. The plate 40 also has edges 43' and 44 extending generally transversely of the edges 42 and 43, and the forwardmost edge 43' is materially shorter than the diagonal rear edge 44. The edges 41 and 42 and 43 and 44 converge forwardly and rearwardly as best shown in FIGURE 2.

The attachment further comprises a rear depending vertical stop plate or deflector 45, having its upper edge secured to the plate 40 along the diagonal edge 44, through the medium of an angle bar 46 or the like. The stop plate 45 has approximately the same vertical height as the side wall portions 13, and extends for the full width of the plate 40 between the edges 42 and 43 of the latter. The top plate 45 projects rearwardly of the housing 10 and from a point near its transverse center toward one side thereof. It may now be seen that the plates 40 and 45 of the attachment constitute an L-shaped deflector structure projecting a substantial distance outwardly beyond the curved end 12 of the housing, at one side of the rear curved end.

The attachment is adjustably secured to the housing 10 for limited horizontal swinging movement in the following manner. An L-shaped bracket 47 is rigidly secured to the housing top wall 11 at the rear end and transverse center of the latter. A hinge plate 48 is laterally adjustably secured to the vertical portion of bracket 47, as at 49. The forward vertical edge of stop plate 45 is hingedly secured at 50 to the adjustable hinge plate 48 so that the plates 40 and 45 may swing horizontally relatively to the housing 10.

Along the short front edge 43' of plate 40, the same is provided with a plurality of spaced adjusting apertures 51, selectively engageable with an upstanding pin 52, rigidly mounted upon a small plate 53, in turn rigidly secured to the housing top wall 11, near the rear end of the adjacent side wall portion 13. By utilizing different ones of the adjusting apertures 51, the angle of the stop plate 45 relative to the housing may be adjusted to regulate the disposition and width of the hay windrow.

A mower cutter blade 54 of the horizontally rotating type is secured through a suitable central hub 55 to the lower end of vertical drive shaft 21, FIGURE 4, and the cutter blade spans the interior of the housing 10 as best shown in FIGURE 3 and has downwardly offset horizontal cutting tip portions 56 which pass close to the side wall portions 13 and curved end 12. The cutting tip portions 56 are also adjacent to the lower edges of side wall portions 13 and stop plate 45, as shown. The cutter blade 54 revolves at high speed in the direction of the arrow shown in FIGURE 3.

An inwardly projecting relatively short and vertically narrow stop finger 57, having a vertical portion 58 is suitably rigidly secured to the forward vertical edge of stop plate or deflector 45, and the finger 57 is set at a slight angle to the stop plate 45 as shown in FIGURES 2 and 3. The finger 57 projects under the housing top wall 11 in close relation thereto and forwardly of the curved end 12 for a relatively short distance, near and slightly to one side of the longitudinal center line of the machine. The finger 57 is spaced above the cutting tip portions 56, in overlying relation thereto, FIGURE 5. The cutting tip portions 56 pass close to the vertical portion 58 of the finger 57. When the stop plate or deflector 45 swings through its arc of adjustment, the finger 57 swings through a corresponding arc in a horizontal plane beneath the top wall 11, but due to its shorter length, the finger 57 traverses a much smaller linear distance than the stop plate 45 when adjusted through the medium of the apertures 51.

In operation, the power lift means of the tractor is utilized to position the housing 10 at the desired elevation relative to the ground, and the lower edges of the side wall portions 13 and stop plate 45 may pass quite close to the ground, together with cutting tip portions 46 of blade 54.

Power is applied to the input shaft 20 to cause the cutter blade 54 to rotate horizontally in the direction of the arrow, and the machine travels forwardly with the tractor. The grass to be cut enters the forward open end of the housing 10 and passes rearwardly into contact with the cutter blade 54, which severs the grass at the desired elevation and whirls the severed material around inside of the housing in the direction of rotation of the cutter blade 54. The cut material or grass will tend to pass rearwardly from the housing 10 to the left of the longitudinal center line of the housing, FIGURE 2, and the cut material will impinge upon the stop plate or deflector 45 and will be formed by the same into a windrow as the machine proceeds forwardly. Any cut material which tends to pass beyond the stop plate 45 with the revolving cutter blade will strike the finger 57 and be stopped thereby and deposited on the ground for engagement by the plate 45 which affords a lateral sweeping action to gather the cut material and deposit it in a windrow behind the traveling machine.

By means of the adjustment afforded at 51—52, the angle of the stop plate 45 and finger 57 may be adjusted or changed to vary the width of the windrow. When the stop plate 45 is adjusted clockwise, FIGURES 1 and 2, the windrow of hay is made more narrow due to the lateral sweeping action of the diagonally angled stop plate. When the stop plate is swung counterclockwise in FIGURE 2, and assumes the position presently illustrated therein, the windrow will be wider when formed. A considerable adjustment of the stop plate 45 and a corresponding variance in the width of the windrow is available through the medium of the apertures 51 and pin 52.

The coaction of the rotary cutter blade 54 with the finger 57, side wall portions 13 and stop plate 45 tends to bruise the cut stems of grass or the like in such a way that they will dry out faster and can be baled sooner than is the case when conventional hay-making means are employed.

When the grass is cut by the cutting tip portions 56 of rotary blade 54, the grass cuttings tend to be whirled around by the cutter blade inside of the housing 10 and these cuttings have considerable velocity and are urged outwardly by centrifugal force. The action of the cutting tip portions on the grass cuttings and the counter-action of the inwardly projecting finger or stop 57 on the cuttings bruises the grass cuttings in such a manner that they tend to dry out faster when they are deposited in a windrow along the ground by the stop plate 45.

With reference to FIGURE 6, a curved side wall portion 59 having end openings 60 is provided for use upon the mower housing 10 in instances where the windrowing attachment according to the present invention is not employed. That is to say, when the elements 40, 45, 46 and 48 are not employed, the curved side wall portion 59 is secured to the left hand rear end portion of the housing, FIGURE 1, by placing the opening 60 in registration with openings 61 at the rear end of the left hand side wall portion 13 and attaching the parts together with bolts or the like. The other end of the curved wall portion 59 then has its opening 60 in registration with one of the openings of L-shaped bracket 47 so as to receive the fastener means 49. When the curved wall portion 59 is thus employed, the right hand rear quadrant only of the housing 10 remains open, and the grass cuttings are deposited rearwardly of the machine in a scattered or wide pattern, rather than in a tight windrow as provided by the adjusable stop plate 45. The curved side wall portion 59 may be dispensed with entirely, if preferred.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A hay making and windrowing machine comprising a mower housing having top and side walls and being open at its forward and rear ends and bottom, mobile draft means for said housing, horizontally rotatable cutter means within said housing below said top wall, a diagonal substantially vertical windrowing deflector plate hingedly secured to the rear end of said top wall near the transverse center thereof and projecting rearwardly of the housing and toward one side thereof and being horizontally swingable to regulate the character of the windrow being formed, a horizontal top plate secured to the upper edge of said deflector plate and disposed substantially at right angles thereto and extending beyond the forward side of the deflector plate in partial overlapping relation to the top wall of the housing and bodily swingable horizontally wih the deflector plate toward and from the housing, and means adjustably interconnecting the forward end of said top plate and the top wall of the housing, whereby said diagonal deflector plate may be releasably secured in the selected angular position relative to the path of travel of the housing, said deflector plate and top plate defining with the top wall of the housing a diagonal passage for the material to be windrowed adjacent the rear of said housing.

2. The invention as defined by claim 1, and a substantially horizontal stop finger element carried by the leading end of the deflector plate and projecting under the top wall of the housing to aid in arresting the movement of cut material to be windrowed through said passage.

3. The invention as defined by claim 1, and wherein last-named means is an upstanding pin element on the top wall of said housing and a plurality of openings in said top plate selectively engageable over the pin element to secure the top plate and deflector plate in the selected adjusted position.

References Cited in the file of this patent
UNITED STATES PATENTS

| | | |
|---|---|---|
| 2,489,059 | Surgi | Nov. 22, 1949 |
| 2,756,556 | Watkins | July 31, 1956 |
| 2,854,046 | Devorak | Sept. 30, 1958 |
| 2,877,616 | Gewalt et al. | Mar. 17, 1959 |
| 2,882,668 | Murillo | Apr. 21, 1959 |
| 2,891,369 | Rietz | June 23, 1959 |
| 2,911,780 | Brady | Nov. 10, 1959 |
| 2,918,776 | Coultas | Dec. 29, 1959 |